United States Patent [19]

Drake

[11] Patent Number: 5,667,353

[45] Date of Patent: Sep. 16, 1997

[54] ROBOT SYSTEM

[75] Inventor: Steven R. Drake, Concord, Mass.

[73] Assignee: Inspex Inc., Billerica, Mass.

[21] Appl. No.: 414,363

[22] Filed: Mar. 31, 1995

[51] Int. Cl.[6] ............................................ B25J 9/00
[52] U.S. Cl. ............................ 414/744.3; 414/744.6; 901/17
[58] Field of Search ........................ 414/744.3, 744.6, 414/749, 751, 941; 901/17, 21

[56] References Cited

U.S. PATENT DOCUMENTS

| | | | |
|---|---|---|---|
| 3,488,692 | 1/1970 | Oda et al. | 901/17 |
| 3,741,409 | 6/1973 | Painter | 901/17 |
| 4,342,515 | 8/1982 | Akiba et al. | |
| 4,376,581 | 3/1983 | Mayer. | |
| 4,377,340 | 3/1983 | Green et al. | |
| 4,461,567 | 7/1984 | Mayer. | |
| 4,502,830 | 3/1985 | Inaba et al. | 901/17 |
| 4,842,476 | 6/1989 | Shiotani | 901/21 |
| 4,895,446 | 1/1990 | Maldari et al. | |
| 5,020,323 | 6/1991 | Hürlimann | 901/21 |
| 5,046,375 | 9/1991 | Salisbury, Jr. | 901/21 |
| 5,076,692 | 12/1991 | Neukermans et al. | |
| 5,207,115 | 5/1993 | Takei | 414/749 |

FOREIGN PATENT DOCUMENTS

| | | | |
|---|---|---|---|
| 398781 A2 | 11/1990 | European Pat. Off. | |
| 228787 | 9/1989 | Japan | 414/744.6 |

OTHER PUBLICATIONS

IBM Technical Disclosure Bulletin, vol. 27, No. 12, May 1985 pp. 6999–7001.

*Primary Examiner*—Karen B. Merritt
*Assistant Examiner*—Gregory A. Morse
*Attorney, Agent, or Firm*—Kriegsman & Kriegsman

[57] ABSTRACT

A robot system includes a support assembly and a robot arm. The robot arm includes a platform and a carriage movable back and forth along the platform. A shuttle is movable back and forth along the carriage. A first belt and pulley system is provided for moving the carriage back and forth along the platform and a second belt and pulley system is provided for moving the shuttle back and forth along the carriage. Each belt and pulley system includes a belt and a first pulley. The diameter of the pulley on the first belt and pulley system is one half the diameter of the pulley on the second belt and pulley system. The first pulley on the first belt and pulley system and the first pulley on the second belt and pulley system are fixedly coupled relative to each other so that rotational movement of one of the first pulleys will cause the same amount of rotational movement of the other one of said first pulleys. Consequently, the amount of movement of the carriage relative to the platform will be one half that of the amount of movement of shuttle relative to the carriage and the resulting movement of the shuttle relative to the platform will be the sum of the movement of the carriage relative to the platform and the shuttle relative to the carriage. The belt on the second belt and pulley system is driven by a motor.

9 Claims, 5 Drawing Sheets

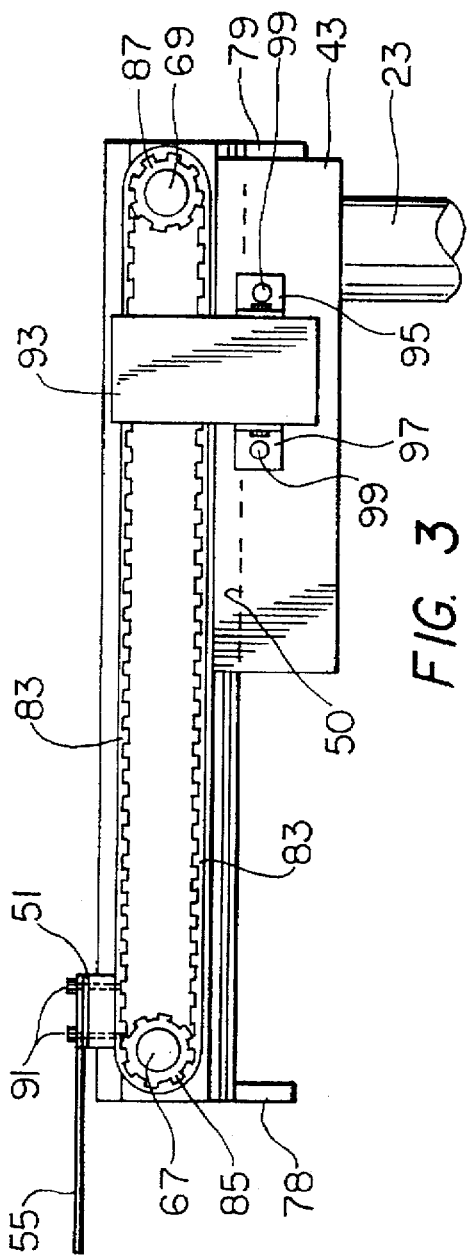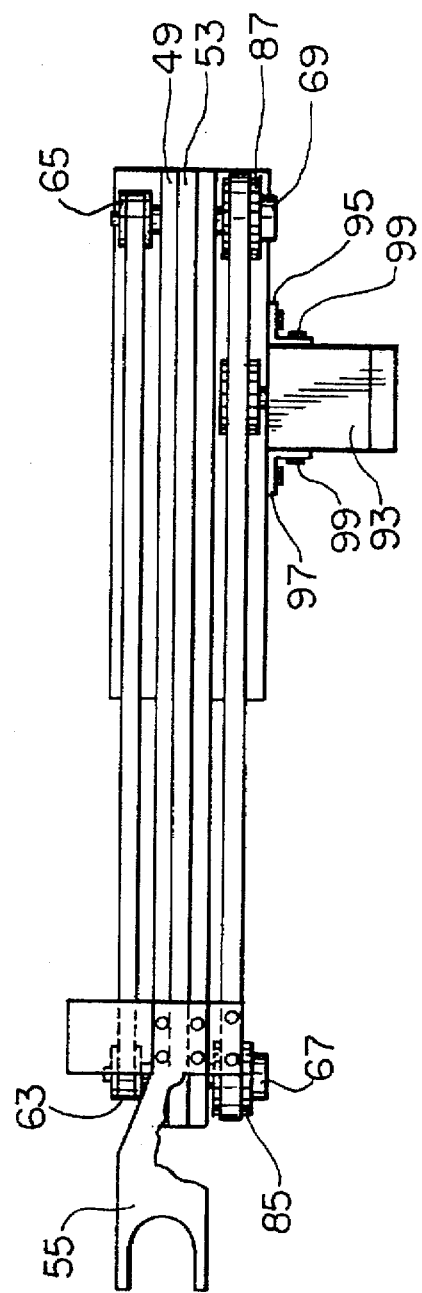

ROBOT SYSTEM

BACKGROUND OF THE INVENTION

The present invention is related generally to robot systems and, more particularly, to a robot system having a new and novel robot arm.

Robot systems are well known and used in recent years in a variety of applications. For example, in inspecting the surfaces of semiconductor wafers for particles and/or defects, robot systems are used to transfer a semiconductor wafer to be tested between a cassette to a table inside an inspection chamber. The robot system is employed in order to avoid contamination or smudges. The robot system usually comprises a support assembly and a robot arm mounted on the support assembly. One type of robot arm that has been used in the past comprises a pair of elongated elements pivotally interconnected in end-to-end relationship. Although generally satisfactory in most instances, in some situations having unique space limitations, this type of robot arm has proven to be a problem.

In U.S. Pat. 4,342,515 there is disclosed an inspection apparatus for detecting unfavorable foreign matters existent on the surface of an object such as semiconductor wafer. The apparatus includes a collimated beam generator portion which projects a collimated beam towards the object to be inspected from a side thereof, and a mechanism which senses light reflected from the surface of the object, through a polarizer plate. In accordance with this invention, the signal-to-noise ratio between a detection signal generated by a pattern of the foreign matter to-be-detected and a signal generated by a normal pattern of the object surface and sensed as a noise component can be enhanced.

In the apparatus disclosed in this patent, the semiconductor wafers are moved by a wafer feed portion.

In U.S. Pat. 4,461,567 there is disclosed an apparatus for printing patterns on a wafer in which the wafers are moved between a magazine and prepositioning stations by a manipulator.

In European Patent Application number 90401210.1, publication number 0398781 there is disclosed an inspection system for inspecting the surfaces of wafers, LCDs and film substrates for flaws. The system includes scanning laser inspection system for quickly inspecting the surface and identifying and locating the flaws. The system generates and displays a flaw map graphically illustrating the article surface and the respective locations of the flaws for subsequent optical inspection. The operator selects a flaw and an optical inspection system is positioned over the selected flaw to provide a magnified image of the flaw. The operator may optically inspect all or any number of the flaws. The invention also includes means for spectrometically analyzing the reflected light to further identify the flaw. In the apparatus disclosed therein the wafers are moved by a robot wafer handling device.

It is an object of this invention to provide a new and improved robot system.

It is another object of this invention to provide a new and improved robot arm.

The foregoing and other objects as well as many advantages of the invention will appear from the description to follow. In the description, reference is made to the accompanying drawings which forms a part thereof, and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limited sense, and the scope of the present invention is best defined by the appended claims.

SUMMARY OF THE INVENTION

A robot system constructed according to this invention comprises a support assembly and a robot arm. The support assembly includes a base and vertical shaft which is movable rotationally and up and down relative to the base. The robot arm is mounted on the vertical shaft and includes a platform, a carriage movable back and forth along the platform, a shuttle movable back and forth along the carriage, a first belt and pulley system for moving the carriage back and forth along the platform, the first belt and pulley system including a belt and a first pulley and a second belt and pulley system for moving the shuttle back and forth along the carriage, the second belt and pulley system including a belt and a first pulley. In one embodiment of the invention, the first pulley on the first belt and pulley system and the first pulley on the second belt and pulley system are fixedly coupled relative to each other so that rotational movement of one of the first pulleys will cause the same amount of rotational movement of the other one of the first pulleys. As a result, the ratio of the amount of movement of the carriage relative to the platform to the amount of movement of shuttle relative to the carriage will be in proportion to the diameters of the two first pulleys and the movement of the shuttle relative to the platform will be the sum of the movement of the carriage relative to the platform and the shuttle relative to the carriage. Means are also provided for driving one of the belts. In another embodiment of the invention, the two belt and pulley systems are not fixedly coupled to each other nd separate means are provided for driving the belt in each one of the belt and pulley systems.

BRIEF DESCRIPTION OF THE DRAWINGS

In the drawings wherein like reference numerals represent like parts:

FIG. 3 is a right side elevation view of the robot arm and support shaft in the robot system shown in FIG. 1;

FIG. 4 is a top view of the robot arm in the robot system shown in FIG. 1;

DETAILED DESCRIPTION OF PREFERRED EMBODIMENTS

Figure 1:
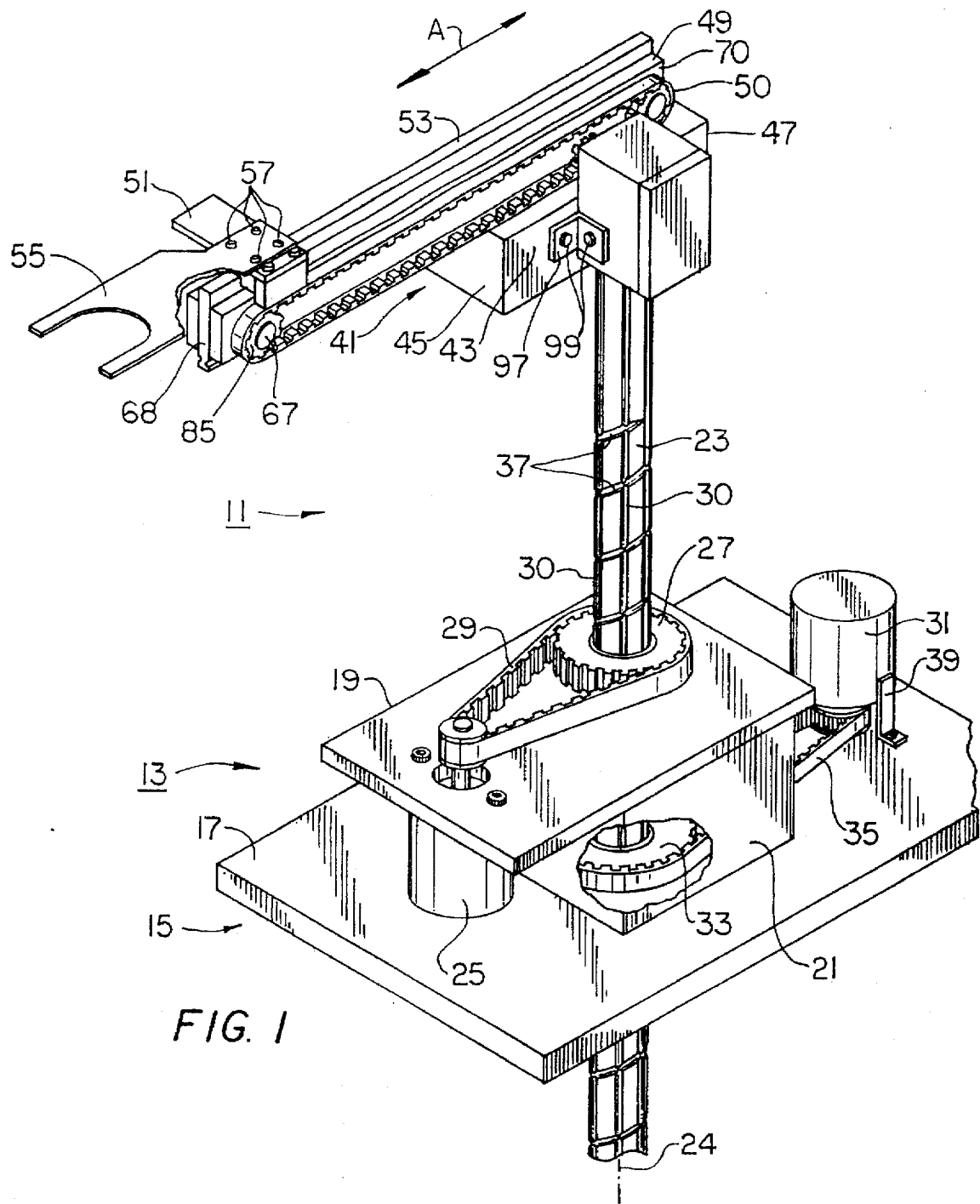
FIG. 1 is a simplified perspective view broken away in part of a robot system constructed according to this invention.
Figure 2:
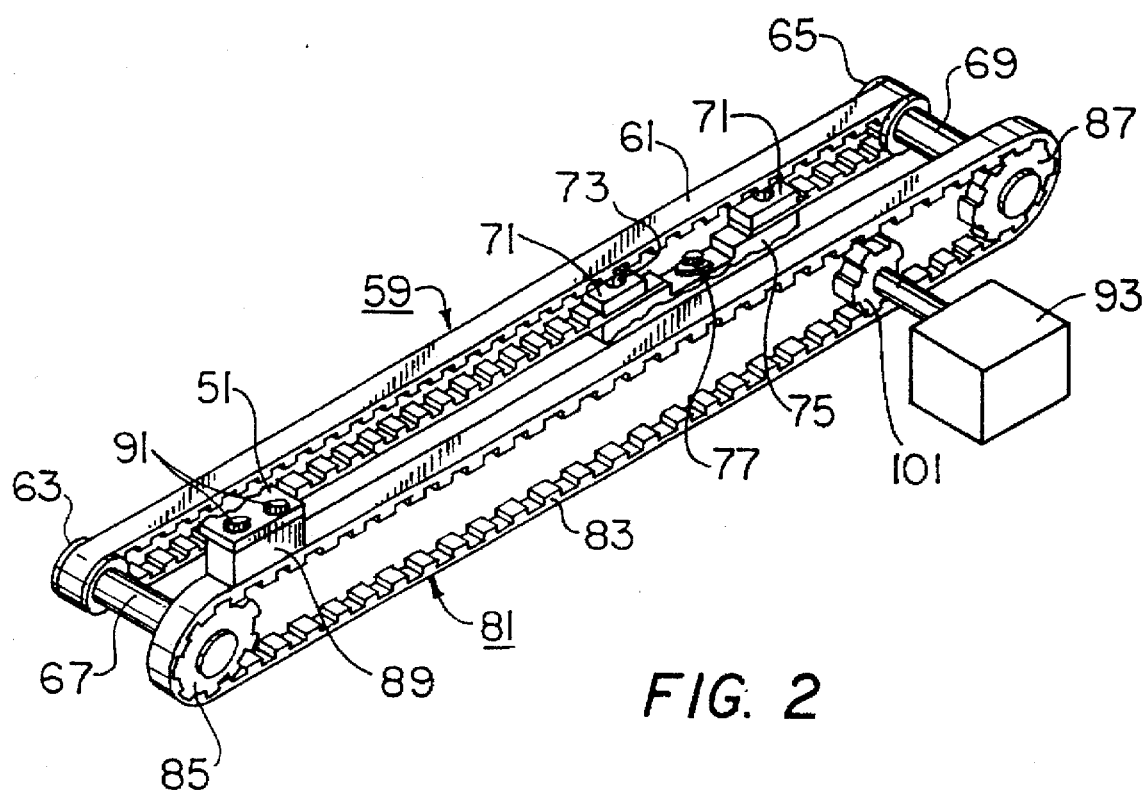
FIG. 2 is an enlarged perspective view of the drive mechanisms for the robot arm in the robot system in FIG. 1 along with fragmentary views of certain other parts of the robot arm.

Referring now to the drawings, and first to FIG. 1, there is shown a robot system constructed according to the teachings of this invention and identified generally by reference numeral 11. Robot system 11 may be used in transferring a semiconductor wafer between a cassette (not shown) and a table (not shown) in a particle detection test chamber but is not intended to be exclusively limited to that particular application.

Robot system 11 is a Rϕv type robot system, i.e. one that includes a robot arm that is movable radially, rotationally and vertically, and includes a support assembly designated by reference numeral 13.

Support assembly 13 includes a base assembly 15 having a lower plate 17, an upper plate 19 and an intermediate frame 21. A shaft 23 is disposed vertically relative base assembly 15 and is movable both rotationally about its longitudinal axis 24 and up and down relative to base assembly 15. Shaft 23 extends down through an opening (not shown) in lower plate 17. Shaft 23 is turned rotationally by a motor 25 which is coupled to a first pulley 27 on shaft 23 by a belt 29. Pulley 27 includes a spline nut (not shown). The spline nut contains ball bearings which engage longitudinal spines 30 formed on shaft 23 to cause rotational movement of shaft 23 as pulley 27 rotates. Motor 25 is fixedly mounted on plate 19 by brackets (not shown). Shaft 23 is movable up and down by a motor 31 which is coupled to a lower pulley 33 on shaft 23 underneath plate 19 by a belt 35. Second pulley 33 includes a drive nut (not shown) which contains ball bearings that ride in a helical groove 37 on shaft 23 to produce up and down movement of shaft 23. Motor 31 is fixedly mounted on plate 17 by brackets, one of which is shown in FIG. 1 and labelled 39.

Robot system 11 further includes a robot arm designated generally by reference numeral 41.

Robot arm 41, see also FIGS. 2 through 6, includes a platform 43 which is fixedly mounted (by means not shown) on the top of shaft 23. Platform 43 includes a front 45 and a rear 47. A carriage 49 is slidably mounted in a groove 50 on platform 43 for movement back and forth on platform 43 in the direction as indicated by arrow A in FIG. 1. A shuttle 51 is slidably mounted on a rail 53 fixedly mounted on carriage 49 for movement back and forth in the direction indicated by arrow A in FIG. 1. Thus, carriage 49 is slidably movable on platform 43 and shuttle 51 is slidably movable on carriage 49. A finger 55 for supporting a wafer (not shown) or other object to be moved is fixedly attached to shuttle 51 by bolts 57.

A first belt and pulley system 59 is provided for moving carriage 49 back and forth along platform 43. First belt and pulley system 59 includes a belt 61, a first pulley 63 and a second pulley 65.

First pulley 63 is fixedly attached to a first axle 67 which is rotably mounted on carriage 49 near the front end 68. Second pulley 65 is rotably mounted on a second axle 69 which is rotably mounted on carriage 49 near the rear end 70. Belt 61 is fixedly attached by nuts 71 and bolts 73 to a bracket 75 which is secured to platform 43 by a bolt 77. Thus, as pulley 63 rotates, carriage 49 will be slidably moved along platform 43. Projections 78 and 79 on the front and rear end of rail 53 limit forward and rearward movement of carriage 49 on platform 43.

A second belt and pulley system 81 is provided for moving shuttle 51 back and forth along carriage 49. Second belt and pulley system 81 includes a belt 83, a first pulley 85 and a second pulley 87.

First pulley 85 is fixedly attached to first axle 67. Second pulley 87 is rotably mounted on second axle 69. Shuttle 51 is fixedly attached to belt 83 by a bracket 89 and bolts 91. Thus, as belt 83 moves, shuttle 51 will move along carriage 49.

The diameter of first pulley 85 is twice that of first pulley 63.

Belt 83 is driven by a motor 93 which is fixedly mounted on platform 43 by brackets 95 and 97 and bolts 99. Motor 93 includes a pulley 101 fixedly mounted on its drive shaft 103 which engages belt 83.

As can be appreciated, since axles 67 and 69 are rotably mounted on carriage 49, belt 83 is mounted on pulleys 85 and 87, and pulley 85 is fixedly mounted on axle 67, rotation of drive shaft 103 of motor 93 will cause shuttle 51 to move along carriage 49, the direction of movement depending on the direction of rotation of drive shaft 103. In addition, since pulley 63 is also fixedly mounted on axle 67, rotational movement of pulley 85 will produce the same rotational movement of pulley 63. Furthermore, since the diameter of first pulley 85 is twice that of first pulley 63, linear movement of shuttle 51 on carriage 49 caused by one complete revolution of first pulley 85 will produce one half of that linear movement of carriage 49 on platform 43. In other words, if carriage 49 moves one inch relative to platform 45, shuttle 51 will move two inches relative to carriage 49, because of the ratio of the diameters of pulleys 63 and 85 and the total linear movement of shuttle 51 relative to platform 43 will be the sum of the above two linear movements, or three inches.

Figure 6:
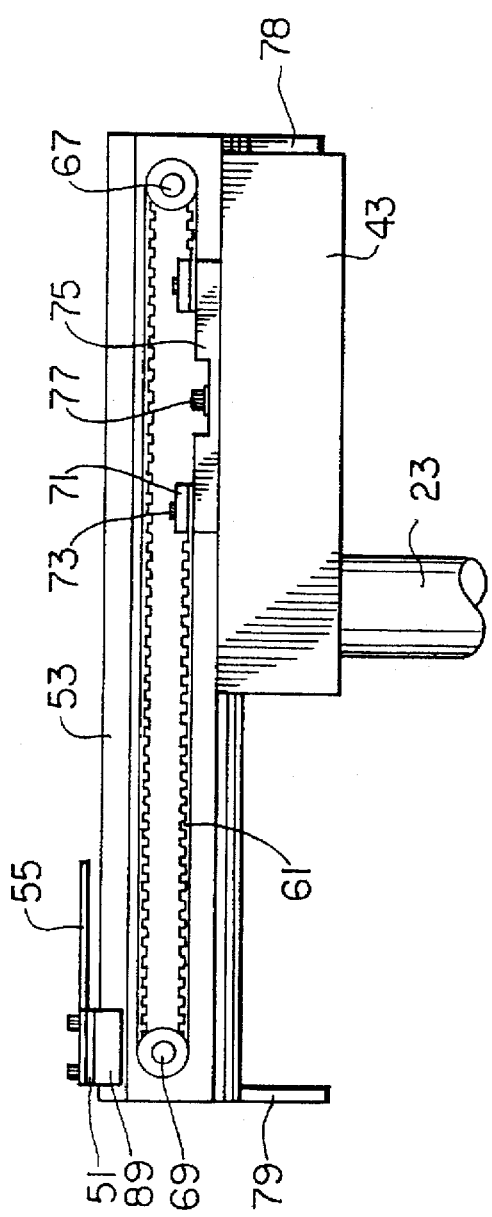
FIG. 6 is a left side view of the robot arm and support shaft in top of the robot system in FIG. 1 with the robot arm positioned differently from that shown in FIG. 1.
Figure 5:
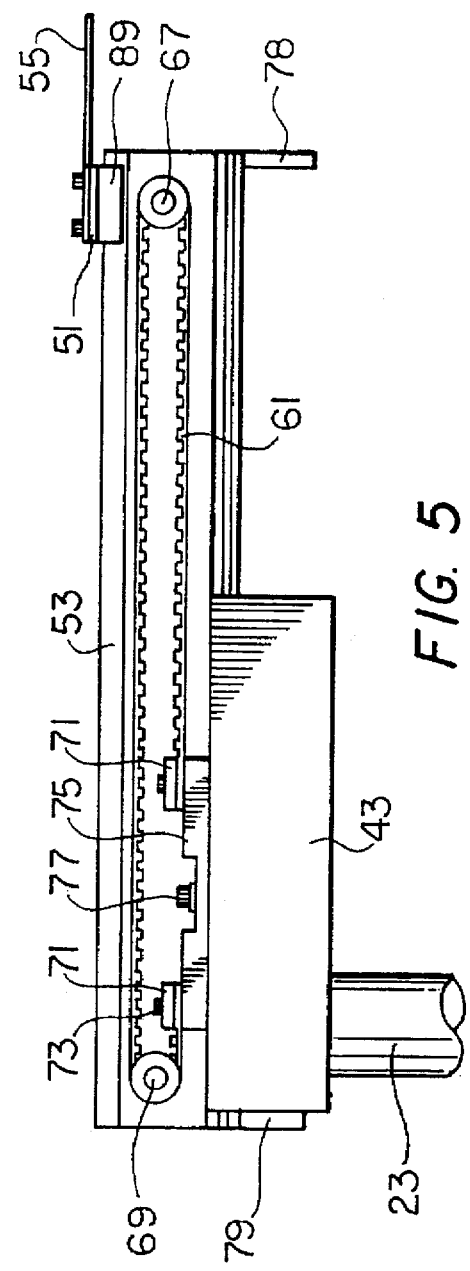
FIG. 5 is a left side view of the robot arm and support shaft in the robot system shown in FIG. 1.

As can be seen, in FIGS. 1 through 5, the robot arm is shown in an extended position, i.e. with carriage 49 moved forwardly on platform 43 and shuttle 51 moved forwardly on carriage 49, while in FIG. 6 carriage 49 is shown in a contracted position, i.e. with carriage 49 moved rearwardly on platform 43 and shuttle 51 moved rearwardly on carriage 49.

As can be further appreciated, the two movements described above can be easily changed further by simply changing the ratio of the two diameters of pulleys 63 and 85. Also, motor 93 could, if desired be arranged so as to drive belt 61 rather than belt 83.

Figure 7:
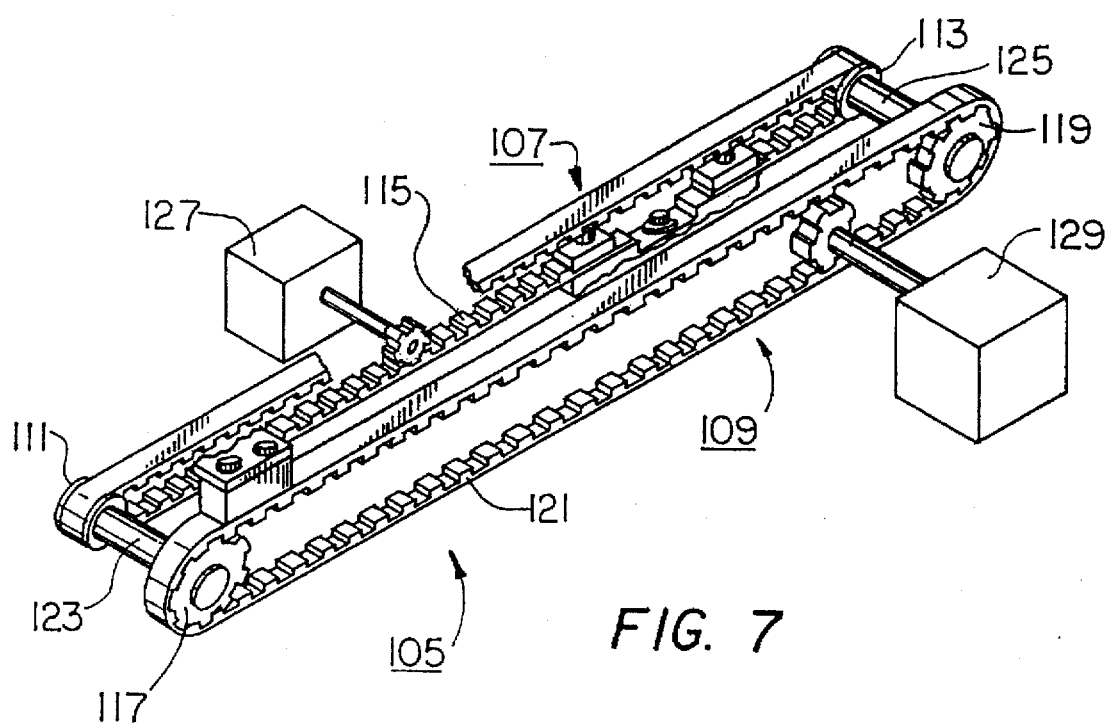
FIG. 7 is an enlarged perspective view of a modification of the drive mechanisms shown in FIG. 2.

In FIG. 7 there is shown another embodiment of the drive mechanism for moving carriage 49 and shuttle 51, the embodiment being identified by reference character 105. In embodiment 105, there are two belt and pulley systems 107 and 109 which operate independent of each other rather than being coupled to each other as in FIG. 1. Belt and pulley system 107 includes a first pulley 111 a second pulley 113 and a belt 115. Belt and pulley system 109 includes a first pulley 117, a second pulley 119 and a belt 121. The two first pulleys 111 and 113 are each rotably mounted on front axle 123, the two second pulleys 117 and 119 are each rotably mounted on rear axle 125 and each belt 115 and 121 is driven by a separate motor 127 and 129, belt 115 being broken away in part in FIG. 7.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A robot system comprising:
   a. a base assembly,
   b. a shaft extending upward from the base assembly and movable vertically and rotationally relative to the base assembly,
   c. means for rotating the shaft relative to the base assembly,
   d. means for moving the shaft up and down relative to the base assembly, and e. a robot arm mounted on the shaft, the robot arm comprising:
  i. a platform fixed to the shaft,
  ii. a carriage movable back and forth on the platform,
  iii. a shuttle movable back and forth on the carriage,
  iv. a first belt and pulley system for moving the carriage back and forth along the platform, said first belt and pulley system including a belt and a first pulley,
  v. a second belt and pulley system for moving the shuttle back and forth along the carriage, said second belt and pulley system including a belt and a first pulley,
  vi. said first pulley on said first belt and pulley system and said first pulley on said second belt and pulley system being fixedly coupled relative to each other so that rotational movement of one of said first pulleys will cause the same amount of rotational movement of said other one of said first pulleys, whereby the ratio of the amount of movement of the carriage relative to the platform and the amount of movement of shuttle relative to the carriage will be in proportion to the diameters of the two first pulleys and the resulting movement of the shuttle relative to the platform will be the sum of the movement of the carriage relative to the platform and the shuttle relative to the carriage, and
  vii. a motor for driving one of the belts, said motor including a drive shaft and a pulley fixedly mounted on said drive shaft, said pulley on said drive shaft engaging the belt in one of said first and second belt and pulley systems.

2. The robot system of claim 1 further including a first axle rotably mounted on said carriage and wherein said first pulley on each one of said belt and pulley systems is fixedly mounted on said first axle.

3. The robot system of claim 2, wherein said belt on said first belt and pulley system is fixed to said platform.

4. The robot system of claim 3, wherein said belt on said second belt and pulley system is fixed to said shuttle.

5. The robot system of claim 4, wherein each belt and pulley system further includes a second pulley.

6. The robot system of claim 5 wherein the two first pulleys are of different sizes.

7. The robot system of claim 5, wherein one of the two first pulleys is twice the size of the other.

8. The robot system of claim 7 wherein the larger pulley is on the second belt and pulley system.

9. The robot system of claim 8 wherein the motor is coupled to the belt of the second belt and pulley system.

* * * * *